(12) United States Patent
Hesketh et al.

(10) Patent No.: US 12,030,725 B2
(45) Date of Patent: Jul. 9, 2024

(54) IN-LINE RAIL VALVE

(71) Applicant: Spiroflow Systems, Inc., Monroe, NC (US)

(72) Inventors: David Francis Hesketh, Matthews, NC (US); Jeffrey Allen Dudas, Waxhaw, NC (US)

(73) Assignee: Spiroflow Systems, Inc., Monroe, NC (US)

( * ) Notice: Subject to any disclaimer, the term of this patent is extended or adjusted under 35 U.S.C. 154(b) by 89 days.

(21) Appl. No.: 17/740,517

(22) Filed: May 10, 2022

(65) Prior Publication Data

US 2023/0365337 A1 Nov. 16, 2023

(51) Int. Cl.
| | |
|---|---|
| *B65G 19/14* | (2006.01) |
| *B65G 19/22* | (2006.01) |
| *B65G 19/28* | (2006.01) |
| *F16K 3/26* | (2006.01) |

(52) U.S. Cl.
CPC ............ *B65G 19/14* (2013.01); *B65G 19/22* (2013.01); *B65G 19/28* (2013.01); *F16K 3/267* (2013.01)

(58) Field of Classification Search
CPC ........ B65G 19/14; B65G 19/22; B65G 19/28; F16K 3/267
USPC .................... 198/735.3, 735.4, 716, 725–729
See application file for complete search history.

(56) References Cited

U.S. PATENT DOCUMENTS

| | | | | |
|---|---|---|---|---|
| 2,487,693 | A * | 11/1949 | Canon .................... | B65G 33/24 |
| | | | | 198/530 |
| 3,111,217 | A * | 11/1963 | Asher .................... | B65G 19/28 |
| | | | | 198/348 |
| 4,378,063 | A * | 3/1983 | Silverthorn ............ | B65G 19/20 |
| | | | | 198/532 |
| 2011/0139588 | A1* | 6/2011 | Petri ...................... | B65G 27/34 |
| | | | | 198/860.4 |
| 2011/0170962 | A1 | 7/2011 | Watson et al. | |
| 2018/0282067 | A1* | 10/2018 | Huff ...................... | B65G 11/206 |
| 2020/0055679 | A1 | 2/2020 | Kramer | |

FOREIGN PATENT DOCUMENTS

| | | |
|---|---|---|
| DE | 1917152 A1 | 10/1970 |
| DE | 3049877 A1 | 1/1983 |
| KR | 101739570 * | 5/2017 |
| KR | 101739570 B1 | 5/2017 |

* cited by examiner

*Primary Examiner* — James R Bidwell
(74) *Attorney, Agent, or Firm* — McDonnell Boehnen Hulbert & Berghoff LLP

(57) ABSTRACT

An in-line valve assembly for a tubular drag conveyer system includes a first tube segment having a first end and defining a first passageway, a second tube segment having a second end and defining a second passageway, and a tubular valve body translatably disposed relative to the second tube segment and defining a valve passageway. The first end of the first tube segment is spaced apart from the second end of the second tube segment by a gap. The valve body is selectively adjustable between a closed position wherein the valve passageway spans the gap and connects the first passageway to the second passageway and an open position wherein the valve passageway is spaced apart from the first passageway by at least a portion of the gap.

20 Claims, 4 Drawing Sheets

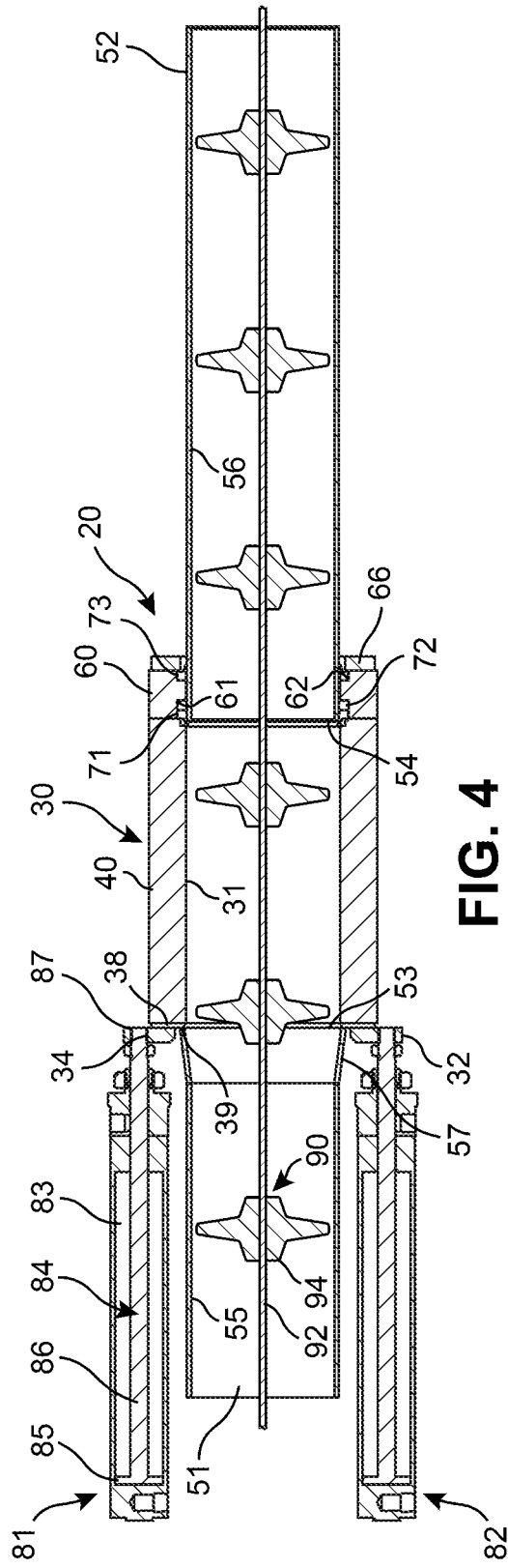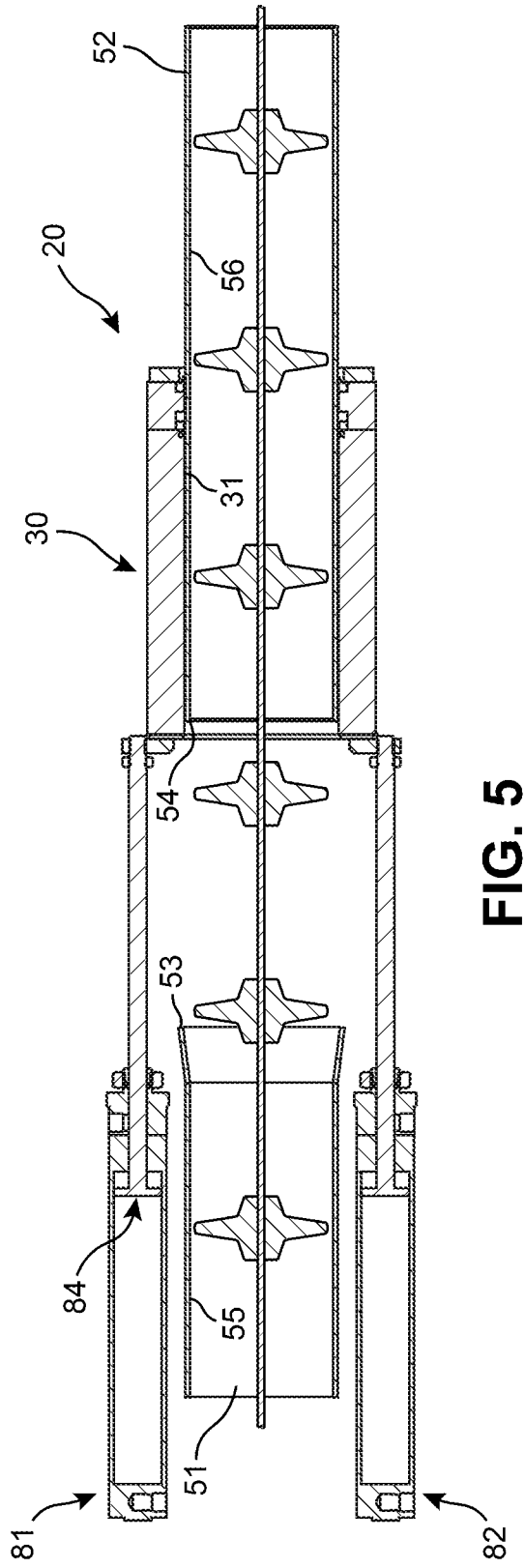

IN-LINE RAIL VALVE

FIELD OF THE INVENTION

The present invention relates generally to a valve assembly, and more particularly, to an in-line valve assembly for use in a tubular drag conveyor system.

BACKGROUND OF THE INVENTION

A tubular drag conveyer typically includes a tubular structure having a conveying mechanism extending therethrough for pushing a product through the tubular structure, where such a product may include divided, flowable bulk materials, for example, powdered, granulated, or small particle materials. The conveying mechanism may include a tensioned chain or cord connected to spaced apart pushing elements generally conforming in shape to an interior of the tubular structure. The pushing elements push the product through the tubular structure as the conveying mechanism is pulled axially through the tubular structure.

It is known to utilize a rotary valve for selectively discharging a quantity of the product being conveyed through the tubular structure in a manner wherein the product drops by the force of gravity for routing the product to the next stage of the corresponding manufacturing or packaging process. The rotary valve may include a rotatable cylindrical component having one or more openings formed in a circumferential surface thereof, wherein selective rotation of the cylindrical component positions the one or more openings to face downwardly and allow for the product to drop therethrough when pushed by the conveying mechanism.

Alternatively, a clamshell type valve is also known for causing the product to fall by the force of gravity when reaching such a valve. The clamshell type valve includes a pivotal shell or flap that pivots away from an underside of a tubular structure for revealing an opening formed therein through which the product may drop.

One concern inherent with the existing conveyer rotary valves and clamshell type valves relates to the manner in which such valves typically require a specific packaging arrangement relative thereto due to the manner in which the mechanisms or the actuator of such valves are usually disposed radially relative to the tubular structure and the direction of movement of the conveying mechanism through the valve. This configuration of such valves accordingly limits the configuration of the remainder of the adjacent components of the tubular drag conveyer, and this factor must be accounted for in the design of the tubular drag conveyer system and associated process. The existing valve configurations are also undesirably complex with respect to the formation and transfer of the necessary rotational motion utilized in the mechanisms thereof, which results in such valve configurations being undesirably expensive to manufacture or purchase.

It would therefore be desirable to provide an alternative valve assembly for use in discharging a product from a tubular drag conveyer that includes a reduced profile and packaging space that is also simplified, inexpensive, and easy to manufacture.

SUMMARY OF THE INVENTION

In accordance with the disclosure of the present invention, an in-line valve assembly for use in a tubular drag conveyer system has surprisingly been discovered.

According to an embodiment of the present invention, an in-line valve assembly for a tubular drag conveyer system includes a first tube segment having a first end and defining a first passageway, a second tube segment having a second end and defining a second passageway, and a tubular valve body translatably disposed relative to the second tube segment and defining a valve passageway. The first end of the first tube segment is spaced apart from the second end of the second tube segment by a gap. The valve body is selectively adjustable between a closed position wherein the valve passageway spans the gap and connects the first passageway to the second passageway and an open position wherein the valve passageway is spaced apart from the first passageway by at least a portion of the gap.

According to an embodiment of the present invention, the tubular drag conveyer system may further include a conveying mechanism extending through each of the first tube segment, the second tube segment, and the valve body. The conveying mechanism includes an elongate element and a plurality of push elements spaced apart with respect to a longitudinal direction of the elongate element.

BRIEF DESCRIPTION OF THE DRAWINGS

The above, as well as other advantages of the present invention, will become readily apparent to those skilled in the art from the following detailed description of a preferred embodiment when considered in the light of the accompanying drawings.

FIG. 4 is a cross-sectional view of the valve assembly taken from the perspective of section lines 4-4 as found in FIG. 2 with various components of the valve assembly removed for clarity, wherein the valve assembly is shown in a closed position.

FIG. 5 is a cross-sectional view of the valve assembly taken from the same perspective as FIG. 4, wherein the valve assembly is shown in an open position.

DETAILED DESCRIPTION OF EXEMPLARY EMBODIMENTS OF THE INVENTION

Figure 1:
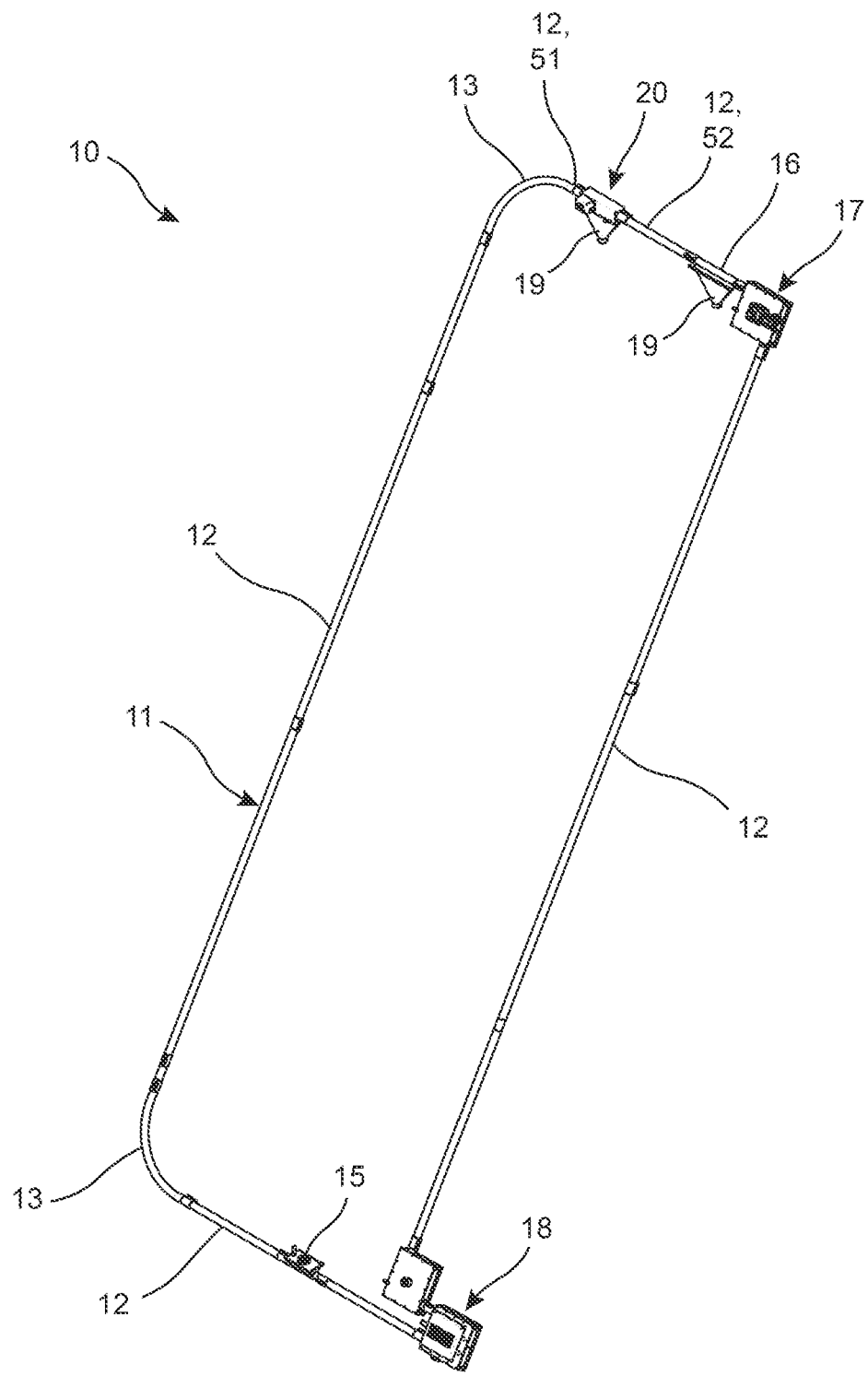
FIG. 1 is a perspective view of an exemplary tubular drag conveyer system according to an embodiment of the present invention.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates a tubular drag conveyer system 10 having an in-line valve assembly 20 according to an embodiment of the present invention. The tubular drag conveyer system 10 may be configured to convey a product therethrough comprising divided, flowable bulk materials such as powdered, granulated, or small particle materials, and may be associated with any corresponding packaging or manufacturing process. The valve assembly 20, which is shown in isolation in FIGS. 2-5, is configured to be selectively adjustable between a closed position wherein the product passes axially through the valve assembly 20 and an open position wherein the product is discharged radially from the valve assembly 20, as explained in greater detail hereinafter.

The tubular drag conveyer system 10 includes a tube assembly 11 comprising a plurality of tube segments 12, 13, which in the present embodiment include a plurality of rectilinear (straight) segments 12 and a plurality of curved or bent segments 13 formed into a closed or looped configuration. Each of the tube segments 12, 13 of the tube assembly 11 may be hollow in configuration with a passageway formed therethrough having substantially the same cross-sectional shape and size extending around the entirety of the tube assembly 11. In the present example, each of the rectilinear segments 12 is substantially cylindrical in configuration and includes a circular passageway cross-section and each of the curved segments 13 includes the circular passageway cross-section extended through an arcuate shape. However, the tube assembly 11 may utilize alternative cross-sectional shapes and configurations without necessarily departing from the scope of the present invention, so long as the components associated therewith include a corresponding cross-sectional shape and configuration for mating with the tube segments 12, 13 in the manner described hereinafter.

A conveying mechanism 90 (shown in FIGS. 4 and 5) extending through the tube assembly 11 includes an elongate element 92 and a plurality of push elements 94 spaced apart from one another with respect to the longitudinal direction of the elongate element 92. The spaces present between adjacent ones of the push elements 94 are provided to receive the product for passage within the tube assembly 11 when the conveying mechanism 90 is circulated through the loop formed thereby. The elongate element 92 may be formed by any flexible and elongate structure or assembly of structures and may be provided in the form of a cord, cable, segmented chain, or the like, as desired, which is similarly formed into a closed loop that is extended throughout and tensioned within the tube assembly 11. The push elements 94 are shown in FIGS. 4 and 5 as having a substantially disc-like cylindrical shape having an outer diameter substantially corresponding to an inner diameter of the tube segments 12, 13. However, the push elements 94 may have substantially any radially extending configuration for extending across the cross-section of the passageway and pushing the product in the direction of movement of each of the push elements 94, including utilizing an alternative cross-sectional shape to the illustrated circular cross-sectional shape. In the provided example, the drag conveyer system 10 further includes a conveyer drive actuator 17 configured to cause the loop formed by the elongate element 92 of the conveying mechanism 90 to circulate through the loop formed by the tube assembly 11. A tensioner 18 may also be disposed at a position along the tube assembly 11 that is spaced apart from the drive actuator 17 in order to maintain the tension on the elongate element 92 throughout the length thereof.

The exemplary tubular drag conveyer system 10 shown in FIG. 1 includes at least some of the different segments 12, 13 arranged to be horizontally extending (perpendicular to the direction of gravity) and at least some of the segments 12, 13 arranged at an incline with respect to the horizontal direction to extend at least partially in the vertical direction (parallel to the direction of gravity). The tube assembly 11 accordingly allows for the transport of the product to different heights when traversing the tube assembly 11.

The drag conveyer system 10 as shown includes an inlet or feed location 15 where the product is first introduced into the hollow passageways formed by the tube assembly 11 and an outlet or discharge location 16 formed by an opening within the tube assembly 11 that is always open and configured to allow the product to fall by the force of gravity when the conveying mechanism 90 pushes the product to the outlet or discharge location 16. In the present example, the outlet or discharge location 16 is provided at a height greater than the inlet or feed location 15 such that the product is conveyed at least partially in the upward direction. The valve assembly 20 and the outlet or discharge location 16 may each be associated with a product guide structure 19 configured to guide the falling product to a specific configuration for moving onward with respect to the associated process or being packaged below either of the valve assembly 20 and the outlet or discharge location 16.

The outlet or discharge location 16 is also disposed along one of the rectilinear segments 12 at a position downstream of the valve assembly 20 of the present invention. The disclosed configuration of the drag conveyer system 10 accordingly includes the product being pushed by the conveying mechanism 90 selectively reaching the outlet or discharge location 16 based on the adjusted position of the valve assembly 20. That is, when the valve assembly 20 is adjusted to the open position and the product is able to exit the tube assembly 11 at the position of the valve assembly 20, the product does not reach the outlet or discharge location 16, whereas when the valve assembly 20 is adjusted to the closed position, the product is able to pass through the valve assembly 20 and reach the outlet or discharge position 16 for discharge from the tube assembly 11. The disclosed configuration of the valve assembly 20 relative to the outlet or discharge location 16 beneficially allows for the selective and alternating discharge of the product from each of two spaced apart positions, which can aid in dividing the progression of the product into two distinct distributions that can then be moved onward independently or packaged independently at the position of each of the valve assembly 20 and the outlet or discharge location 16.

Referring now specifically to FIGS. 2-5, the valve assembly 20 is shown in isolation as spanning a space formed between a pair of the rectilinear segments 12 of the tube assembly 11. As used hereinafter, the pair of the rectilinear segments 12 shown in FIGS. 2-5 is referred to as first tube segment 51 and second tube segment 52. The first tube segment 51 and the second tube segment 52 are axially aligned and spaced apart from one another with respect to the common axial directions thereof to form an axial gap between an end 53 of the first tube segment 51 and an end 54 of the second tube segment 52, wherein the ends 53, 54 face towards and oppose each other. A first passageway 55 is formed through the first tube segment 51 and a second passageway 56 is formed through the second tube segment 52 with the passageways 55, 56 axially aligned. An end portion 57 of the first tube segment 51 including the end 53 may be provided to be radially outwardly tapered with respect to a direction of passage of the product and the conveying mechanism 90 through the passageway 55, which results in the end portion 57 being frustoconical in shape.

The valve assembly 20 may be disposed within and mounted to an enclosure 21. The enclosure 21 may include a plurality of sidewalls 22 and a window panel (not shown) spanning the perimeter of the rectangular shape formed by the sidewalls 22 at the upper sides thereof for delimiting an interior of the enclosure is the vertical upward direction, wherein the window panel may be formed from a transparent material to allow for inspection of the operation of the valve assembly 20 from a position above the enclosure 21. The first tube segment 51 and the second tube segment 52 are also mounted to the enclosure 21 with respect to opposing ones of the sidewalls 22 spaced apart from each other with respect to the common axial direction of each of the tube segments 51, 52. The enclosure 21 may be devoid of a panel or delimiting structure at the bottom sides of the sidewalls 22 for forming a product opening 23 at the bottom side of the enclosure 21 through which the product associated with the drag conveyer system 10 can drop by the force of gravity when the valve assembly 20 is adjusted to the open position.

The valve assembly 20 includes a tubular valve body 30 that is slidably or otherwise translatably disposed relative to the first tube segment 51 and the second tube segment 52 with respect to the common axial direction thereof, wherein the first tube segment 51 and the second tube segment 52 remain stationary relative to the remainder of the drag conveyer system 10 during the axial translation of the valve body 30. The valve body 30 of the present embodiment is substantially cylindrical in shape to correspond to the cylindrical shape of each of the adjacent tube segments 51, 52, but it should be apparent that the valve body 30 may include an alternative cross-sectional shape for mating with the tube segments 51, 52 according to an alternative cross-sectional configuration without necessarily departing from the scope of the present invention. The valve body 30 also extends axially in the same common axial direction as the tube segments 51, 52.

Figure 2:
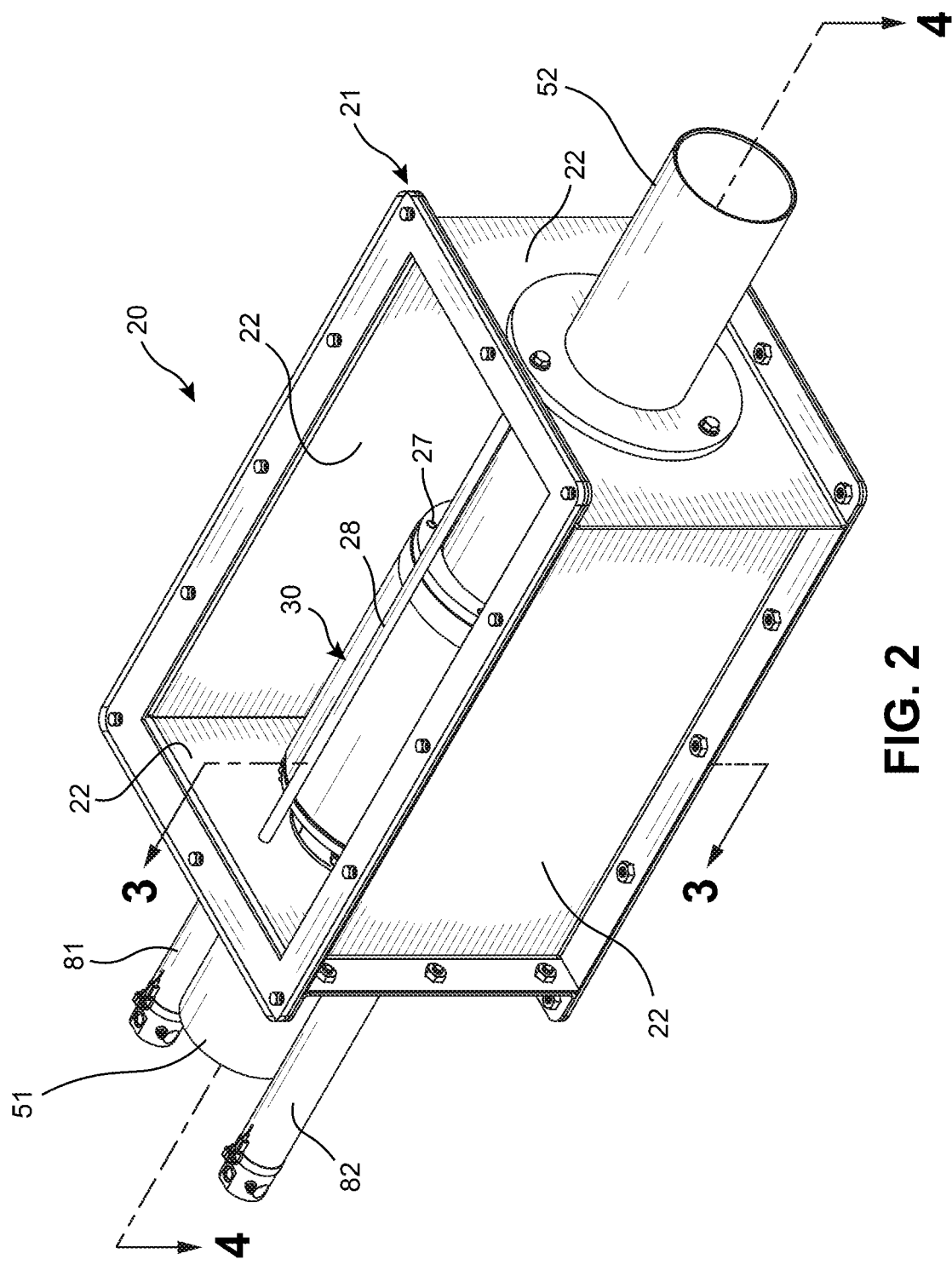
FIG. 2 is a perspective view of an in-line valve assembly of the tubular drag conveyer system of FIG. 1 according to an embodiment of the present invention.
Figure 3:
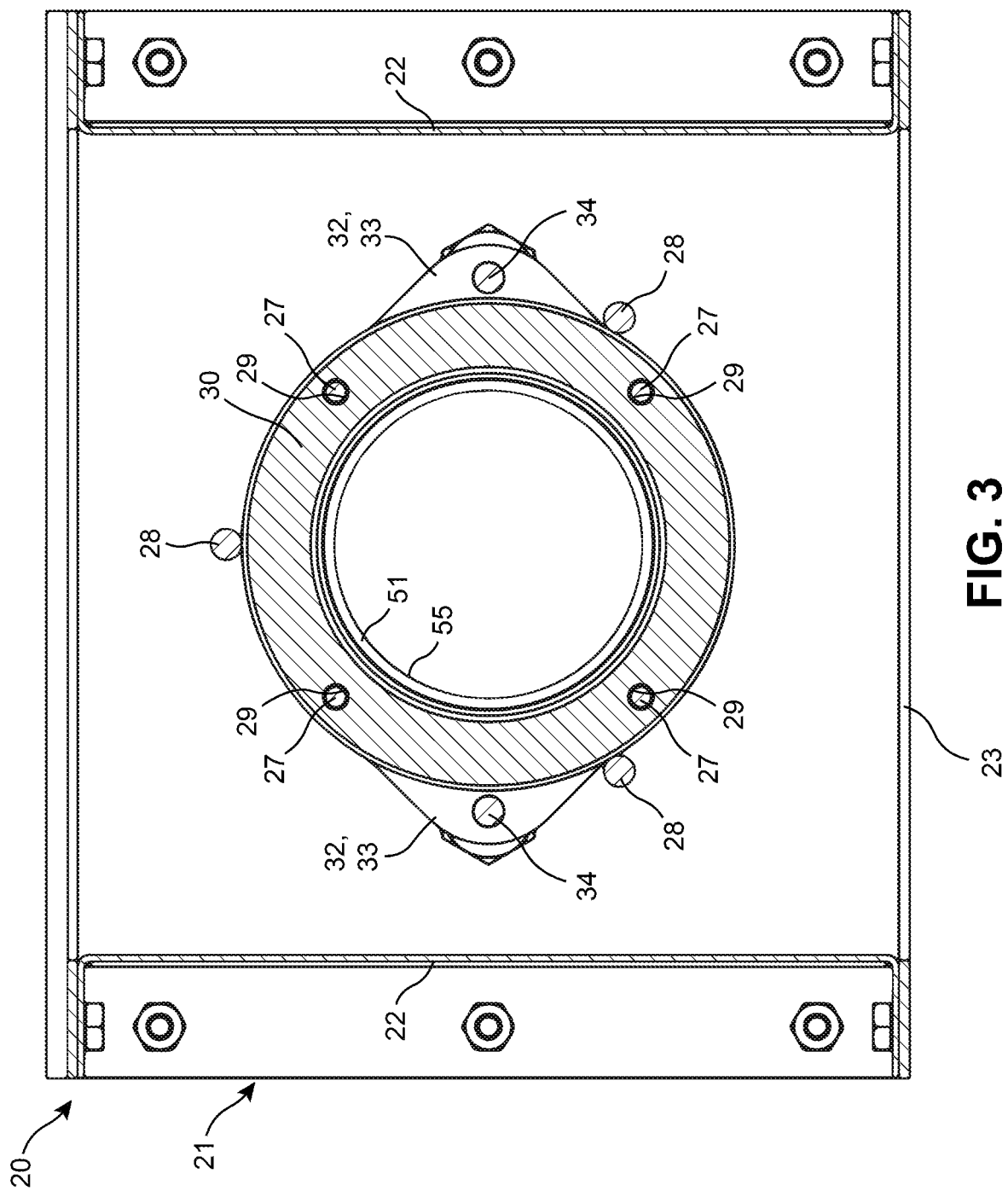
FIG. 3 is a cross-sectional view of the valve assembly taken from the perspective of section lines 3-3 as found in FIG. 2.

As best shown with reference to FIGS. 2 and 3, the translatable or sliding motion of the valve body 30 may be guided by a plurality of guide rails 28 disposed to contact an outer circumferential surface of the valve body 30 at a plurality of circumferentially spaced positions. Each of the guide rails 28 extends longitudinally in parallel to the axial direction of the valve body 30 with the guide rails 28 extending across the same oppositely arranged pair of the sidewalls 22 of the enclosure 21 as the valve assembly 20. The guide rails 28 are positioned to delimit movement of the valve body 30 with respect to the radial directions of the valve body 30. In some embodiments, the valve assembly 20 includes at least three of the guide rails 28 spaced at equal circumferential intervals to ensure that valve body 30 is restricted with respect to all radial directions thereof, as desired.

The valve assembly 20 includes at least one linear actuator configured to drive the axial translation of the valve body 30 relative to the tube segments 51, 52. More specifically, the at least one linear actuator is configured to translate the valve body 30 in a reciprocating manner wherein a direction of travel of the valve body 30 with respect to the axial direction thereof is reversible when adjusting the valve assembly 20 between the closed and open positions thereof. In the present embodiment, the at least one linear drive actuator includes a first linear drive actuator 81 and a second linear drive actuator 82, which are disposed to extend axially in parallel to the axial direction of the valve body 30 with a central axis of each of the respective linear drive actuators 81, 82 offset laterally relative to the central axis of the valve body 30. However, fewer or more of the linear drive actuators may be utilized in driving the motion of the valve body 30, as desired, while remaining within the scope of the present invention.

The first and second linear drive actuators 81, 82 are each pneumatic actuators utilizing pressurized air to control the axial position of the valve body 30. The first linear drive actuator 81 includes a piston chamber 83 mounted to the enclosure 21 and affixed thereto and a corresponding piston 84. The piston 84 includes a piston head 85 reciprocatingly disposed within the piston chamber 83 and a piston rod 86 extending longitudinally from the piston head 85 in parallel to the axial direction of the valve body 30, wherein at least a portion of an axial length of the piston rod 86 extends outside of the piston chamber 83. A pressure to either side of the piston head 85 is regulated within the piston chamber 83 via control of an associated pressure source (not shown) to control the axial position of the corresponding piston rod 86, which causes the reciprocating motion of the piston 84. An end of the piston rod 86 disposed distally from the piston head 85 forms a coupling portion 87 of the piston rod 86 configured for coupling the piston rod 86 to a corresponding portion of the valve body 30, as explained in greater detail hereinafter when specifically describing the structure of the valve body 30. The second linear drive actuator 82 is substantially identical in configuration and operation to the first linear drive actuator 81, hence further description is omitted herefrom, and the same reference numerals are utilized to refer to the common components of either of the linear drive actuators 81, 82.

Although disclosed as pneumatic linear drive actuators, it should be apparent that alternative drive actuators having a reciprocating capability may be utilized without departing from the scope of the present invention, including, but not limited to, a hydraulic drive actuator or an electrically controlled drive actuator such as a solenoid, as desired.

The valve body 30 includes, with respect to a direction extending from the first tube segment 51 towards the second tube segment 52, a connection plate 32, a gasket 38, a conduit segment 40, a tube engaging segment 60, and an end plate 66, each of which is annular/cylindrical in shape to correspond to the cylindrical shape of each of the ends 53, 54 of the opposing tube segments 51, 52. Each of the connection plate 32, the gasket 38, the conduit segment 40, the tube engaging segment 60, and the end plate 66 includes a central opening having an inner diameter substantially equal to or slightly greater than an outer diameter of the second tube segment 52, which is arranged concentrically relative to the valve body 30 and configured to slidably receive at least the conduit segment 40, the tube engaging segment 60, and the end plate 66 thereover during adjustment of the valve body 30 from the closed position to the open position. The openings formed through the connection plate 32, the gasket 38, and the conduit segment 40 collectively form a valve passageway 31 through the valve body 30 through which the product can pass when the valve body 30 is in the closed position.

As shown in FIGS. 2 and 3, a plurality of clamping rods 27 may extend through at least a portion of the valve body 30 in parallel to the axial direction thereof with the clamping rods 27 spaced circumferentially about the valve body 30. In some embodiments, the clamping rods 27 extend axially from one of the connection plate 32 or the end plate 66 and extends towards and through the other of the connection plate 32 or the end plate 66 with a distal end of each of the clamping rods 27 forming a threaded portion configured to mate with a corresponding threaded coupling such as a nut. In other embodiments, the clamping rods 27 may extend through the entirety of the valve body 30 with one end of each of the clamping rods 27 forming a head and the opposing end forming a threaded portion configured to mate with a threaded coupling as described above. In either event, the clamping rods 27 extend through axially extending apertures 29 extending through the corresponding segments of the valve body 30 receiving the clamping rods 27 therethrough, depending on which of the above configurations is utilized.

As best shown in FIG. 3, the connection plate 32 includes a pair of outwardly flanged portions 33 extending to laterally opposing sides of the conduit segment 40. Each of the flanged portions 33 includes a coupling portion 34 formed by an opening and threaded coupling configured to threadably engage the coupling portion 87 of an aligned piston rod 86 of the corresponding linear drive actuator 81, 82 for affixing the corresponding piston rod 86 axially relative to the connection plate 32. However, any cooperating structures may form the coupling portions 34, 87 or any suitable coupling method may be utilized to securely couple and affix each of the piston rods 86 to an aligned and corresponding one of the flanged portions 33 such that axial translation of the piston head 85 of the corresponding linear drive actuator 81, 82 causes a corresponding axial translation of the valve body 30.

The gasket 38 is compressed axially between the connection plate 32 and the conduit segment 40 and includes a tube sealing surface 39 formed by a portion of an end face of the gasket 38 disposed radially inward of an inner circumferential surface of the connection plate 32 and facing towards the end 53 of the tube segment 51 as formed by the frustoconical end portion 57 thereof. The outward tapering of the end portion 57 relative to the remainder of the tube segment 51 provides numerous advantageous features. First, the outward tapering of the end portion 57 prevents undesired interference between the end portion 57 and the push elements 94 as the conveying mechanism 90 passes by the end 53 of the tube segment 51, as the push elements 94 may tend to become misaligned relative to the passageway 55 due to the sagging of the corresponding elongate element 92 when spanning the ends 53, 54. The push elements 94 accordingly avoid contact with the end 53 of the tube segment 51 when passing from the gap between the ends 53, 54 to the interior of the passageway 55. Second, the outward tapering ensures that sealing contact can be made between the end 53 and the tube sealing surface 39 when the valve assembly 20 is in the closed position, despite the valve body 30 otherwise having a greater inner diameter than an outer diameter of the cylindrical portions of the adjacent tube segments 51, 52. Third, the tapering of the end portion 57 ensures that an inner diameter of the first passageway 55 at the end 53 of the tube segment 51 substantially corresponds to an inner diameter of the conduit segment 40 of the valve body 30 to allow for a smooth transition of the product when transferred between the passageways 55, 31. The axial compression of the gasket 38 also seals the joint present between the connection plate 32 and the conduit segment 40 with respect to the radial direction at the inlet end of the valve passageway 31.

The conduit segment 40 extends axially a distance that substantially corresponds to the axial distance present between the opposing ends 53, 54 of the tube segments 51, 52 such that the conduit segment 40 spans the gap present therebetween when the valve assembly 20 is adjusted to the closed position such that the passageways 55, 31, 56 are all arranged in communication with each other with respect to the passage of the product via the conveying mechanism 90. The conduit segment 40 may be formed from a transparent material to allow the product to be visualized when passing through the valve assembly 20, as desired.

As shown in FIG. 4, the tube engaging segment 60 is configured to slide/translate along the outer circumferential surface of the second tube segment 52 during the adjustment of the valve assembly 20 between the open and closed positions, which results in a telescopic relationship between the valve body 30 and the second tube segment 52 when the valve body 30 slidably receives the second tube segment 52 therein. The tube engaging segment 60 includes a first indented portion 61 having a first wiper seal 71 and a center seal 72 disposed therein as well as a second indented portion 62 having a second wiper seal 72 disposed therein. The first wiper seal 71 extends axially across the joint present between the conduit segment 40 and the tube engaging segment 60 and the second wiper seal 72 extends axially across the joint present between the tube engaging segment 60 and the end plate 66. Each of the seals 71, 72, 73 forms a sealing element configured to slide along the outer circumferential surface of the second tube segment 52 during the adjustment of the valve assembly 20 between the open and closed positions and seals the joint present between the valve body 30 and the second tube segment 52 with respect to the axial and radial directions.

In use, the adjustment of the valve assembly 20 to the closed position includes the conduit segment 40 spanning the axial gap present between the ends 53, 54 of the tube segments 51, 52 to allow the conveying mechanism 90 to push the product between the passageways 55, 56 within the tube segments 51, 52. In the provided embodiment, the conveying mechanism 90 is configured to push the product in the direction extending from the second tube segment 52 towards the first tube segment 51 (leftward with respect to the perspective of FIGS. 4 and 5) such that the product is pushed in a direction opposing the motion of the valve body 30 when adjusted from the closed position to the open position (rightward with respect to the perspective of FIGS. 4 and 5). The product is accordingly transported from the passageway 56 to the passageway 31, and then from the passageway 31 to the passageway 55, when the valve assembly 20 is adjusted to the closed position. The closed position also corresponds to the piston 84 of each of the linear drive actuators 81, 82 adjusted to a fully retracted position within the corresponding piston chamber 83 (leftmost position shown in FIG. 4) to cause the tube sealing surface 39 to axially engage the end 53 of the first tube segment 51. An adjustment of the valve assembly 20 from the closed position to the open position includes the piston 84 of each of the linear drive actuators 81, 82 adjusted to a fully extended position within the corresponding piston chamber 83 (rightmost position shown in FIG. 5) to cause the tube sealing surface 39 to disengage axially from the end 53 of the first tube segment 51. The tube engaging segment 60 and the corresponding seals 71, 72, 73 slide along the outer circumferential surface of the second tube segment 52 as the valve body 30 translates axially away from the first tube segment 51, which corresponds to a direction opposing the motion of the product through the valve assembly 20 as prescribed by the conveying mechanism 90.

The adjustment of the valve assembly 20 to the open position results in the passageway 55 being spaced axially from the passageways 31, 56. The continued operation of the conveying mechanism 90 causes the pushing elements 94 to push the product reaching the end 54 of the second tube segment 52 and/or the end of the valve body 30 to fall by the force of gravity for directing the product to the next stage of the corresponding process, which may include packaging the product. In the present embodiment, the product falling away from the end 54 of the second tube segment 52 or the end of the valve body 30 falls through the product opening 23 formed at the bottom of the enclosure 21 for further guidance by the product guide structure 19.

The disclosed in-line valve assembly 20 beneficially provides a simplified and cost-effective valve for selectively discharging the product from the tube assembly 11 via the use of a linear drive actuator and linear motion in place of the rotational motion of the conveyer valves of the prior art. The use of the linear drive actuator also allows for the valve assembly 20 to be reduced in radial profile in comparison to the conveyer valves of the prior art due to the manner in which the linear drive actuators can be aligned in parallel immediately adjacent the corresponding tube segments 51, 52.

From the foregoing description, one ordinarily skilled in the art can easily ascertain the essential characteristics of this invention and, without departing from the spirit and scope thereof, can make various changes and modifications to the invention to adapt it to various usages and conditions.

We claim:

1. An in-line valve assembly for a tubular drag conveyer system, the valve assembly comprising:
    a first tube segment having a first end and defining a first passageway, wherein an end portion of the first tube segment is outwardly tapered towards the first end thereof;

a second tube segment having a second end and defining a second passageway, the first end of the first tube segment spaced apart from the second end of the second tube segment by a gap; and a tubular valve body translatably disposed relative to the second tube segment and defining a valve passageway, the valve body selectively adjustable between a closed position wherein the valve passageway spans the gap and connects the first passageway to the second passageway and an open position wherein the valve passageway is spaced apart from the first passageway by at least a portion of the gap.

2. The valve assembly of claim 1, further comprising a linear drive actuator configured to selectively translate the valve body towards or away from the second tube segment.

3. The valve assembly of claim 2, wherein the linear drive actuator is a pneumatic actuator.

4. The valve assembly of claim 3, wherein a piston of the pneumatic actuator is coupled to the valve body.

5. The valve assembly of claim 2, wherein the linear drive actuator extends longitudinally in parallel to the first tube segment.

6. The valve assembly of claim 1, wherein the valve body includes a tube engaging segment slidably disposed along an outer circumferential surface of the second tube segment.

7. The valve assembly of claim 6, wherein the tube engaging segment includes at least one sealing element contacting the outer circumferential surface of the second tube segment.

8. The valve assembly of claim 1, wherein an inner diameter of the first passageway at the first end of the first tube segment corresponds to an inner diameter of the valve passageway.

9. The valve assembly of claim 1, wherein a gasket disposed at an end of the valve body sealingly contacts the first end of the first tube segment when the valve body is in the closed position.

10. The valve assembly of claim 1, wherein the valve body is telescopically received over the second tube segment when the valve body is adjusted from the closed position to the open position.

11. The valve assembly of claim 1, wherein the valve body is transparent.

12. The valve assembly of claim 1, wherein a product conveyed through the second tube segment falls by the force of gravity when the product reaches the second end of the second tube segment and the valve body is in the open position.

13. The valve assembly of claim 1, wherein a conveying mechanism extends across each of the first passageway, the second passageway, and the valve passageway regardless of the position of the valve body.

14. The valve assembly of claim 1, wherein the valve assembly is mounted to an enclosure.

15. The valve assembly of claim 14, wherein the enclosure includes an opening in a bottom side thereof.

16. The valve assembly of claim 1, wherein a plurality of guide rails guide the translation of the valve body relative to the second tube segment.

17. The valve assembly of claim 16, wherein the guide rails are circumferentially spaced around an outer circumferential surface of the valve body.

18. The valve assembly of claim 1, wherein the first passageway, the second passageway, and the valve passageway are axially aligned.

19. A tubular drag conveyer system comprising:
an in-line valve assembly comprising:
a first tube segment having a first end and defining a first passageway, wherein an end portion of the first tube segment is outwardly tapered towards the first end thereof;
a second tube segment having a second end and defining a second passageway, the first end of the first tube segment spaced apart from the second end of the second tube segment by a gap; and
a tubular valve body translatably disposed relative to the second tube segment and defining a valve passageway, the valve body selectively adjustable between a closed position wherein the valve passageway spans the gap and connects the first passageway to the second passageway and an open position wherein the valve passageway is spaced apart from the first passageway by at least a portion of the gap; and
a conveying mechanism extending through each of the first tube segment, the second tube segment, and the valve body, the conveying mechanism including an elongate element and a plurality of push elements spaced apart with respect to a longitudinal direction of the elongate element.

20. An in-line valve assembly for a tubular drag conveyer system, the valve assembly comprising:
a first tube segment having a first end and defining a first passageway;
a second tube segment having a second end and defining a second passageway, the first end of the first tube segment spaced apart from the second end of the second tube segment by a gap; and
a tubular valve body translatably disposed relative to the second tube segment and defining a valve passageway, the valve body selectively adjustable between a closed position wherein the valve passageway spans the gap and connects the first passageway to the second passageway and an open position wherein the valve passageway is spaced apart from the first passageway by at least a portion of the gap, and wherein the valve body includes a tube engaging segment slidably disposed along an outer circumferential surface of the second tube segment.

* * * * *